May 14, 1957 P. A. BRAGG 2,791,985
HOG AND CATTLE GUARD FOR FEED FEEDERS
Filed Nov. 9, 1955 2 Sheets-Sheet 1
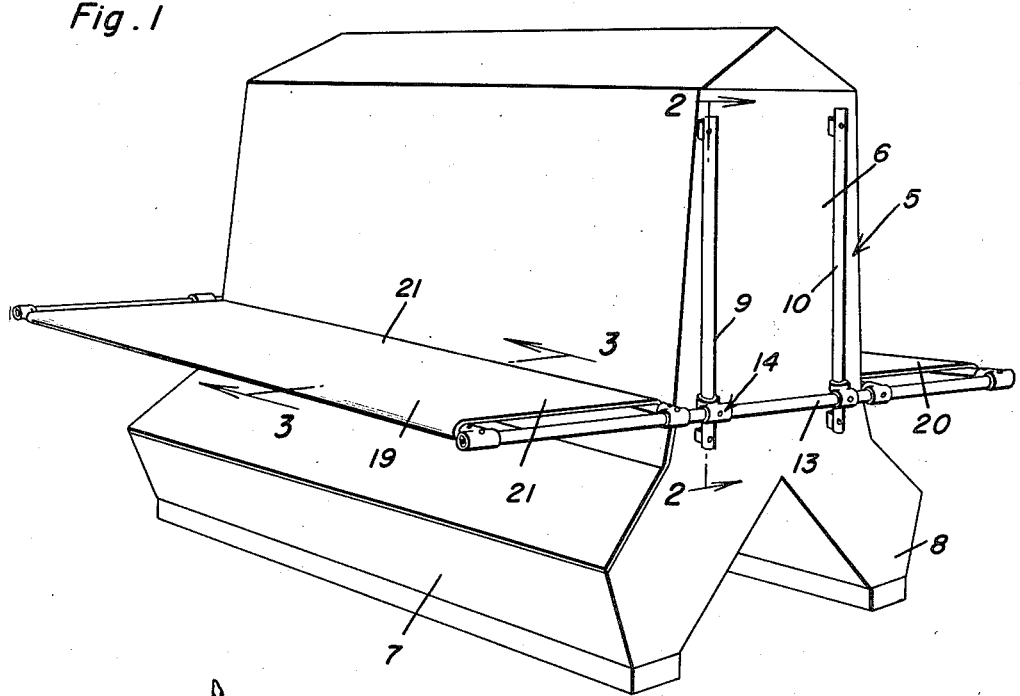
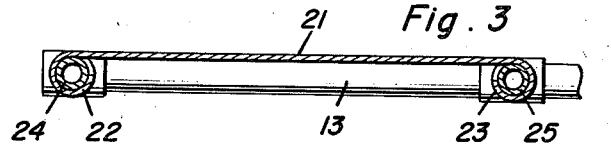
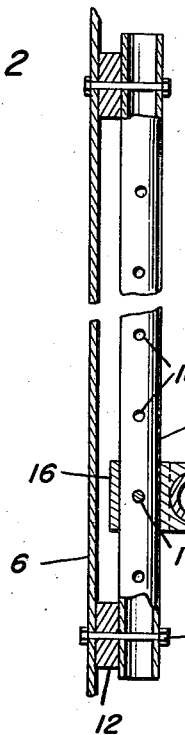
Perrie A. Bragg
INVENTOR.
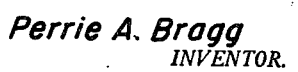

May 14, 1957 P. A. BRAGG 2,791,985
HOG AND CATTLE GUARD FOR FEED FEEDERS
Filed Nov. 9, 1955 2 Sheets-Sheet 2

Perrie A. Bragg
INVENTOR.

BY *Clarence A. O'Brien*
*and Harvey B. Jacobson*
Attorneys

United States Patent Office 2,791,985
Patented May 14, 1957

2,791,985

HOG AND CATTLE GUARD FOR FEED FEEDERS

Perrie A. Bragg, Winchester, Ind.

Application November 9, 1955, Serial No. 545,813

1 Claim. (Cl. 119—52)

This invention relates to new and useful improvements in a guard shield for hog and cattle self-feeders, and more particularly as a guard to prevent hogs, cattle or other undesirable animals from having access to the feeding trough thereby limiting the use to the feeder to the particular animals and size animals for which the feeder is intended.

An important object of my invention is to provide a guard which is supported in a desired elevated position above the feeding trough to prevent access of undesirable animals thereto.

Another object of the invention is to provide a guard for feeders constructed with feeding troughs at opposite sides of the hopper and wherein a guard is provided for each of the feeding troughs and mounted as a unitary structure on the feeder.

A further object of the invention is to provide a vertical guide for the guard at each end of the hopper of the feeder and on which the guards are vertically slidable to adjust the guards at a desired elevated position above the feed trough.

A still further object is to provide a device of this character of simple and practical construction, which is efficient and reliable in operation, relatively inexpensive to manufacture and which may be easily and quickly installed in position on the feeder without necessitating any changes or alterations in the construction thereof, and which otherwise is well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is an enlarged vertical sectional view of one of the vertical guides for adjusting the guard and taken on a line 2—2 of Figure 1;

Figure 3 is an enlarged transverse sectional view of one of the guards taken on a line 3—3 of Figure 1;

Figure 4 is an enlarged perspective view of one of the spacers for the guide;

Figure 5:
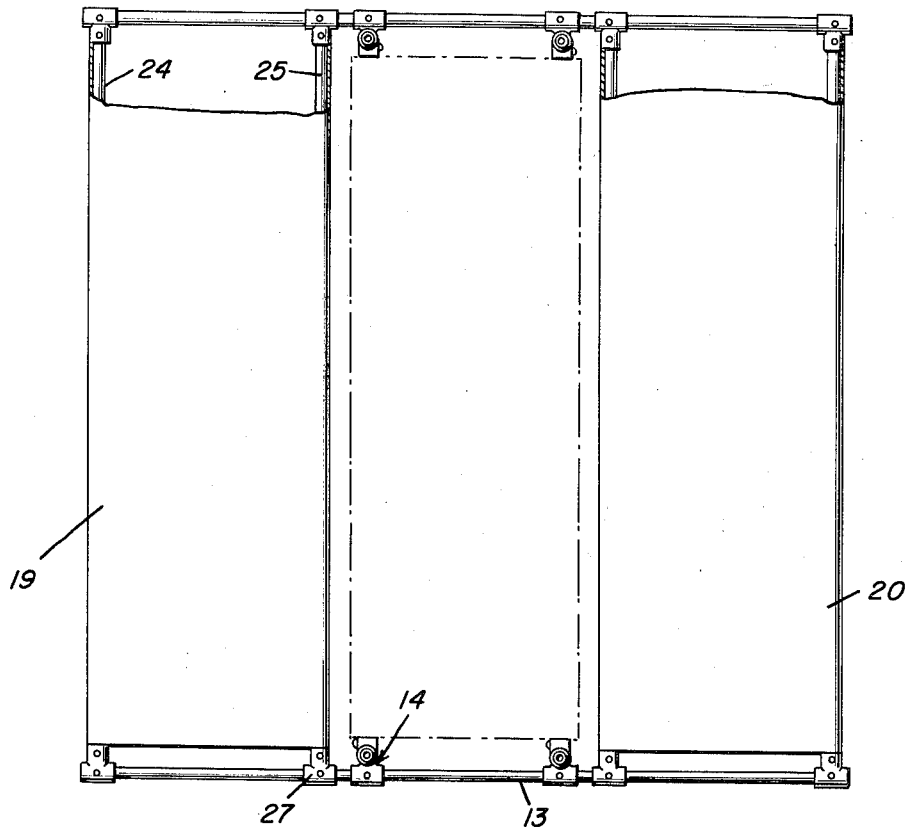
Figure 5 is a top plan view with parts broken away and shown in section.
Figure 6:
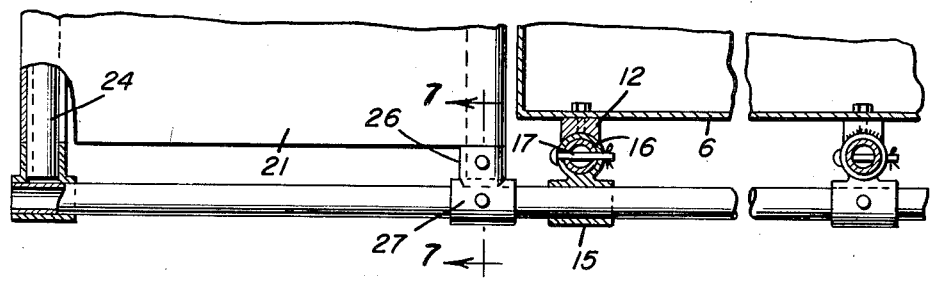
Figure 6 is an enlarged fragmentary plan view of one end of the guard and with parts broken away and shown in section.
Figure 7:
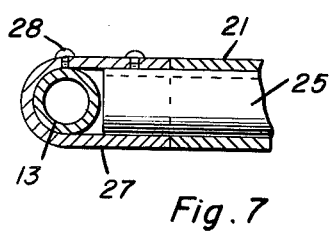
Figure 7 is a sectional view of one of the fittings for adapting the guard to one of the supporting arms and taken on a line 7—7 of Figure 6.

Referring now to the drawings in detail, wherein for the purpose of illustration, I have disclosed preferred embodiments of my invention, the numeral 5 designates a self-feeder of a conventional type and which includes a hopper 6 having a pair of feed troughs 7 and 8 at the lower side portions thereof.

A pair of guide rods 9 and 10 are attached in a vertical position at each end of the hopper 6 by means of bolts and nuts 11 and with spacing blocks 12 supported by the bolts behind the guide rods to space the latter outwardly from the adjacent surface of the hopper.

A pair of arms 13 are secured in fittings designated generally at 14 and which comprise horizontal sleeves 15 in which the arms are received and vertical sleeves 16 which are integrally formed with the sleeves 15 and which are slidably mounted on the guide rods 9 and 10. The fittings 14 are secured in vertically adjusted position on the rods 9 and 10 by means of pins 17 inserted transversely through the sleeves 16 and selectively engaged in a vertical row of openings 18 in the guide rods 9 and 10.

The arms 13 project outwardly at opposite sides of the hopper 6 and on the other ends thereof, guards 19 and 20 are supported. Each guard comprises a sheet metal member 21 of rectangular shape and having its longitudinal edge portions rolled to form sleeves 22 and 23 in which rods 24 and 25 are respectively engaged. The ends of the rods 24 and 25 are secured in the shank portions 26 of T-fittings 27 which are secured on the arms 13 by screws or other suitable fasteners 28.

The guards 19 and 20 are supported on the arms 13 in a horizontal outwardly projecting position at the opposite sides of the hopper 6 to overlie the respective feed troughs 7 and 8 to prevent access of hogs, cattle or other animals not desired to be fed at the troughs and the arms 13 and guards 19 and 20 are secured in a desired vertically adjusted position on the guide rods 9 and 10 to permit various sizes of hogs, cattle, etc., to feed from the troughs.

The guards 19 and 20 and the arms 13 may be detached from the guide rods 9 and 10 and the latter detached from the hopper for handling or storing the device in a knock-down form.

The guide rods 9 and 10 and the arms 13 are preferably constructed of tubular metal.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In combination, a feeder including a hopper having a pair of feed troughs at opposite sides thereof, a pair of vertical guide rods at each end of the hopper, a horizontal arm slidable vertically on each pair of guide rods and projecting laterally outwardly at opposite sides of the hopper, means securing the arms in vertically adjusted position on the vertical rods, a pair of spaced apart parallel longitudinal rods at each side of the hopper and supported on the adjacent outwardly projecting end portions of said horizontal arms, and sheet metal guards supported on said pairs of longitudinal rods in a horizontal position overlying the respective troughs.

References Cited in the file of this patent

UNITED STATES PATENTS

| 608,863 | Innis | Aug. 9, 1898 |
| 1,114,482 | Johnson | Oct. 20, 1914 |
| 1,257,638 | Robbins | Feb. 26, 1918 |
| 1,810,782 | Morris | June 16, 1931 |